March 14, 1967　　J. KARLOVSKY, JR ETAL　　3,309,143
CONTINUOUS MINER HAVING ANGULARLY ADJUSTABLE TRIMMER BARS
Filed July 13, 1964　　3 Sheets-Sheet 1

Inventors
Jerry Karlovsky, Jr.
C. C. Conway
John M. Cookson
By Bedell and Burgess
attys.

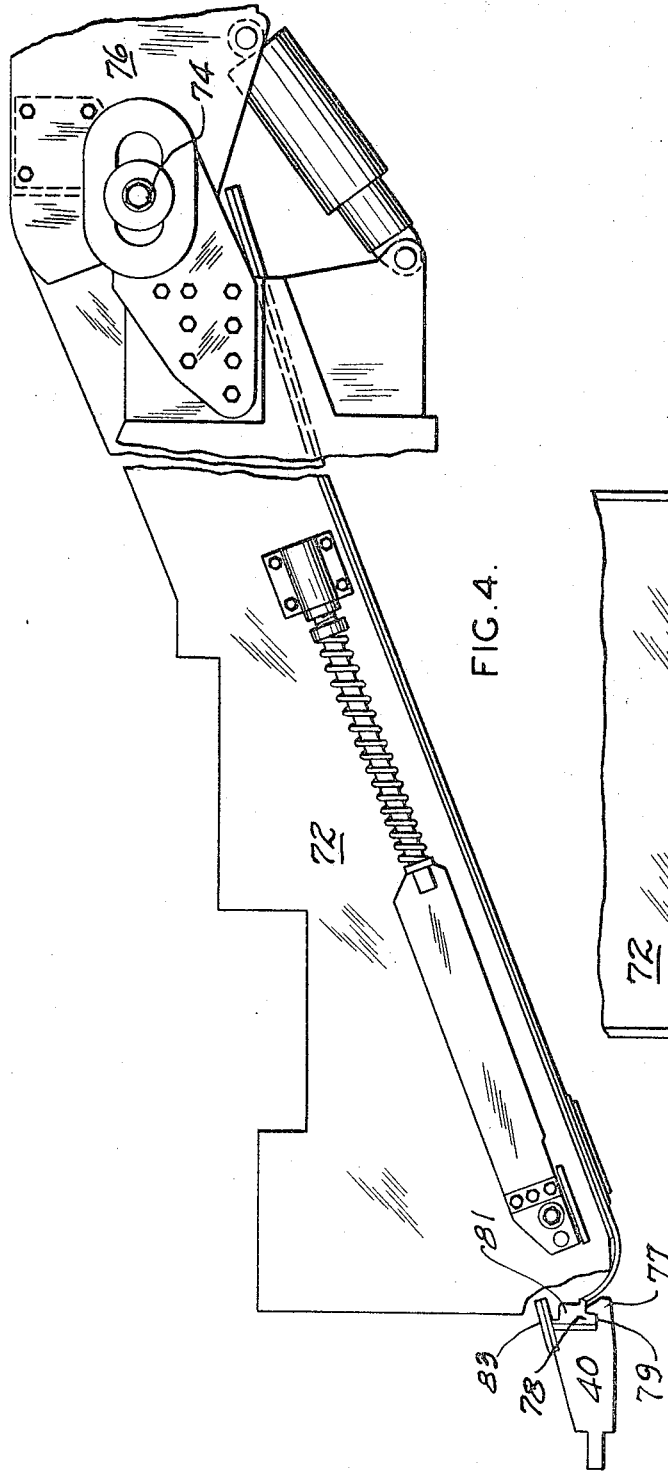
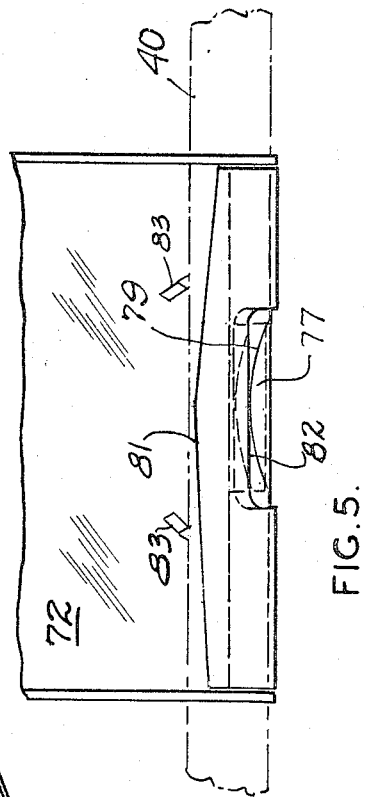
FIG. 4.
FIG. 5.

United States Patent Office 3,309,143
Patented Mar. 14, 1967

3,309,143
CONTINUOUS MINER HAVING ANGULARLY ADJUSTABLE TRIMMER BARS
Jerry Karlovsky, Jr., Clifford C. Conway, and John M. Cookson, all of Nashville, Ill., assignors to National Mine Service Company, Pittsburgh, Pa., a corporation of West Virginia
Filed July 13, 1964, Ser. No. 382,065
12 Claims. (Cl. 299—57)

The invention relates to a continuous mining machine of the McKinlay type which includes parallel boring shafts spaced transversely of the machine and having radial arms carrying rotating cutters at their forward ends and having a trimmer cutting chain moving along vertically spaced guides, extending transversely of the machine, to trim the cusps left between the bores produced by the rotating cutters. The invention comprises structure particularly adapting such a machine for cutting or boring into a seam of coal, ore or other material inclined from the horizontal transversely of the direction of travel of the machine.

The main object of the invention is to maintain the floor of the bore and the machine traction means substantially horizontal, while inclining the roof of the bore, transversely of the path of the machine. This is advantageous particularly in establishing the roof of the cut along or parallel to the top of a steeply pitching seam.

This general object is attained by adjusting the radial cutter arms of the two boring shafts to cut to different diameters, respectively; adjusting ends of the cutter chain guide or trimmer bars until they are substantially tangent to the peripheries of the cuts made by the rotating cutters; then tilting the gear case or other support for the boring bars transversely of the machine until the lower peripheries of the rotating cutters are at approximately the same level and the lower bar is horizontal. This positions the upper trimmer bar at a steeper angle to the horizontal than is possible with earlier machines, and enables the machine to operate effectively in substantially inclined or "pitching" seams. To further cooperate with the tilted gear case and horizontal lower trimmer bar, the conveyor which leads rearwardly and upwardly from the lower trimmer bar is pivotally mounted on the lower trimmer bar so as to incline to the bar transversely of the machine and as determined by its rear supports on the tilted gear case.

In the accompanying drawings illustrating a selected embodiment of the invention:

FIG. 1 is a side view of a continuous miner embodying the invention and showing in vertical longitudinal section a bore cut by the machine into a mine seam.

FIG. 2 is a front view of the machine showing its telescoping cutter arms extended and showing in vertical transverse section the bore in the mine seam.

FIG. 3 is a vertical transverse section on line 3—3 of FIG. 1 with some parts removed to better illustrate the construction.

FIG. 4 is a longitudinal view of the machine conveyor trough showing the mounting of its rear end on the main frame and the mounting of its forward end on the lower trimmer bar.

FIG. 5 is a detail front view of the mounting of the conveyor trough on the lower trimmer bar.

Figure 6:
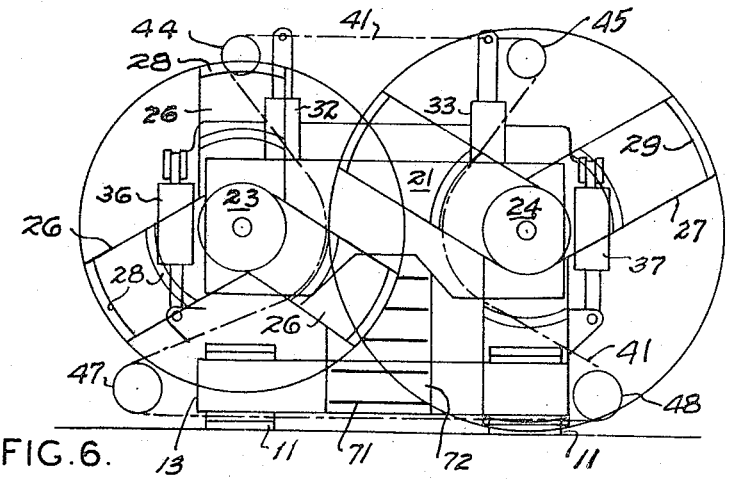
FIGS. 6, 7 and 8 are largely diagrammatical and show the front of the machine with its cutter arms in successive positions assumed when adapting the machine for boring into an inclined or "pitching" seam.

The main parts of the machine, common to machines of this general type, are a pair of endless treads 11 running over wheels or on shoes (not shown) supporting a sub frame 13. Brackets 15 on frame 13 carry front and rear upright hydraulic cylinder and piston units 17 and 19 at each side of the machine and these units support a main frame 20 at four points. The main frame 20 has a gear case 21 at the front end thereof and drive motors 22 extending rearwardly therefrom. The cylinder pistons at one side of the frame are operable independently of those at the opposite side of the frame.

Journaled in the gear case portion 21 of main frame 20 are boring shafts 23, 24 extending lengthwise of the machine and spaced apart transversely of the machine, each mounting a plurality of telescoping radial arms 26, 27 respectively carrying individual cutters 28. As the machine moves forwardly, shafts 23, 24 and their cutter arms are rotated and generally cylindrical bores B are cut into the face of the mine seam S, the bores intersecting as seen in FIG. 2, leaving triangular cusps C at top and bottom of the bore.

At the rear of radial arms 26, 27, upright hydraulic cylinders 32, 33, spaced apart transversely of the machine, are mounted on the upper portion of gear case 21 and their pistons carry the upper trimmer bar 34 provided with a cutter chain guide 34a. Upright hydraulic cylinders 36, 37 are pivoted at their upper ends to ears 22 at the sides of gear case 21 and have pistons extending downwardly and pinned at P to the upstanding ends 38 of the lower trimmer bar 40 extending from side to side of the machine and provided with a cutter chain guide 40a for an endless cutter chain 41 driven by a sprocket 42, journaled on gear case 21, and passed over idler sprockets 44, 45, journaled on opposite end portions of upper trimmer bar 34, and over sprockets 47, 48, journaled on opposite end portions of lower trimmer bar 40, and over sprockets 49, journaled on gear case 21 and over takeup sprockets 50. Each sprocket 50 has a hydraulically operated device 51 (FIG. 1) maintaining the cutting chain properly tensed. The trimmer bar mountings for sprockets 47, 48 include extensions 52 (FIG. 3) slidable in the trimmer bar by cylinder and piston units 53, described in detail in an application filed July 3, 1964, Serial No. 380,157.

The connection between each end of the upper trimmer bar and the corresponding supporting piston comprises a pin 55 (FIG. 3) flattened top and bottom and slidable in a horizontal slot 56 in the trimmer bar. The play of pins 55 in slots 56 automatically accommodates elongation of the distance between sprockets 44, 45 when the trimmer bar is angled when the pistons of cylinders 32, 33 are moved differently. Gear case 21 has a pair of depending jaws 25 near each end and the upstanding ends 38 of the lower trimmer bar slide over these jaws. A pivot pin 58 is fixed in the left hand end 38 of trimmer bar 40 and slides vertically in the slot between the left hand jaws 25 on the gear case. Below pin 58 is a pin 60 similarly slidable in the slot between jaws 25 and also slidable in a horizontal slot 61 in the same end of the trimmer bar. Vertically spaced pins 59 and 62 at the opposite end of the trimmer bar are slidable in the slot between right hand jaws 25 and are slidable in vertically spaced horizontal slots 63 and 64 in the trimmer bar end. This provides for pivotal connection between the lower trimmer bar and the gear case and accommodating elongation of the distance between pins 60, 64 when the pistons of cylinders 36, 37 are moved differently, and also accommodating tilting of the gear case when its cylinder-piston supports 17, 19 at opposite sides of the machine are moved differently.

The machine includes a chain conveyor with arms 71 operable in a trough 72 extending rearwardly and upwardly (FIG. 4) from lower trimmer bar 40 with its rear end supported on a hinge pin 74 extending across the upper rear end of the chute and seated in the forward end of an upper chute 76. A rear lug 77 at the center of bar 40 has an upwardly facing groove 78, elongated lengthwise of the bar, the bottom 79 of the groove being arched upwardly from end to end. The forward end of the conveyor trough includes a hitchbar 81 with depending lug 82 received in groove 78 and resting on the bottom of the latter so that during tilting of the trimmer bar the conveyor trough may rock in the groove and remain horizontal. Lock bars 83 are welded to the trimmer bar and project over the transverse end member of the conveyor trough and limit its rocking movement, or its dislodgement from the trimmer bar groove because of the rocking movement.

Clearance is provided between gear case 21 and the upper edges of the sides of conveyor trough 72 to accommodate their relative movement, and to close the gap resulting from this clearance, flap valves 85 (FIG. 3) are pivoted to the gear case at 86 and springs 87 yieldingly swing the valves into contact with the sides of the trough irrespective of the elevating and lowering of the trimmer bar or of the inclination of the gear case to the trough and of the resulting variation in the vertical distance from the edge of the trough to the bottom of the gear case. With this structure it is not necessary for the operator to make any adjustment of the conveyor trough or mechanism when the gear case and lower trimmer bar are tilted relative to each other. Each of the cylinders and pistons raising, lowering and tilting the gear case and the trimmer bars and projecting and retracting the lower sprockets may be operated independently of the other cylinders, and this makes it possible to adjust the bore and cuts to the extent desired to parallel the top of the seam.

Figure 7:
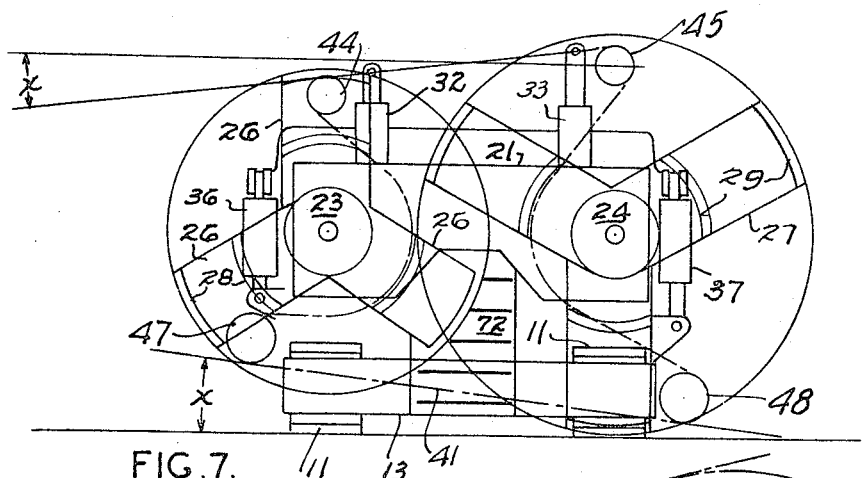

FIGS. 2 and 3 show the pistons of cylinders 32, 33, 36, 37 projected to their maximum extent and thereby raising trimmer bar 34 and lowering trimmer bar 40 to their uppermost and lowermost levels respectively. While this setting may be utilized to cut maximum bore into a seam, particularly a horizontal seam, the present machine is also utilized to adapt the machine for cutting a bore into a pitching seam with the top of the bore inclined to the floor of the cut which will be horizontal. For this purpose cutter arms 26 on the left hand side of the machine, as viewed in FIG. 6, may be retracted to near their minimum diameter and the pistons in cylinders 32, 36 may be retracted to bring the left hand ends of trimmer bars 34, 40 substantially tangent to the path of left hand cutters 28 (FIG. 7). At the same time cutter arms 27 on the right hand side of the machine are extended to a greater diameter and the pistons in cylinders 33, 37 are extended to bring the right hand ends of trimmer bars 34, 40 substantially tangent to the path of the right hand cutters 29. In this position lower trimmer bar 40 is inclined upwardly to the left, at an angle X to the horizontal, and upper trimmer bar 34 is inclined upwardly to the right at substantially the same angle to the horizontal.

The pistons in cylinders 17 and 19 supporting the left hand side of main frame 20 including gear case 21 from the sub frame 13 may then be retracted to lower that side of the gear case (FIG. 8) and the pistons in cylinders 17 and 19 at the opposite side of the machine may be projected to raise that side of the gear case so that the gear case angle to the horizontal transversely of the machine becomes approximately the angle X mentioned above. Lower bar 40 is then horizontal and upper bar 34 is inclined at twice the angle X mentioned above, as measured from the horizontal, thus doubling the angle of inclination of the upper bar to the horizontal and providing for a greater inclination of the roof cut than could be obtained by the usual adjustment of the upper bar only. It is to be understood that each of the cylinders are separately actuated by hydraulic valves controlled by the operator. As illustrated in FIGURE 1, a control valve A connected to a suitable source of pressurized hydraulic fluid has a conduit $A_1$ connected to the upper portion of cylinder 37 and a conduit $A_2$ connected to the lower portion of cylinder 37. Actuation of valve A supplies fluid under pressure to either the upper portion or the lower portion of cylinder 37 to extend or retract the piston rod associated therewith and connected to the lower trimmer bar. A control valve B is similarly connected to a source of pressurized hydraulic fluid and has conduit $B_1$ connected to the lower portion of cylinder 33 and conduit $B_2$ connected to the upper portion of cylinder 33. Valve B thus controls the raising and the lowering of the end of trimmer bar 34 associated therewith. Valves C and D have similar conduits (not shown) connected to the upper and lower portions of cylinders 32 and 36 respectively to raise and lower the respective ends of the upper trimmer bar and the lower trimmer bar.

Figure 8:
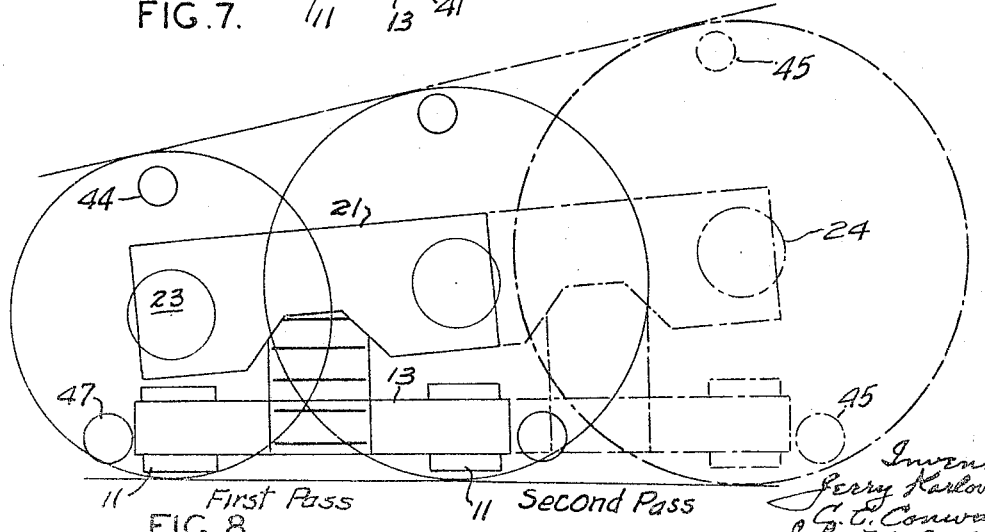

After a pass has been made with the cutter bars and arms and gear case adjusted, as shown at the left hand side of FIG. 8, the machine may be withdrawn, the left hand cutter arms 26 extended to the diameter of the right hand cutter arms 27 during the first pass, and the right hand cutter arms 27 and their cutters 29 extended to the maximum, the cutter bars raised and lowered without changing their angular relation, to bring them substantially tangent to the new paths of the cutters, the machine shifted to the right, and a second pass made as indicated in FIG. 8. This will provide a substantially continuous inclined upper surface of the bore corresponding to the inclination of the seam.

It will be understood that the cutter arms and trimmer bars may be reversely inclined to make successive bores for a seam inclined in the opposite direction from right to left. Also, if desired, the machine may be reversed end for end after the first operation and the rotors and trimmer bars adjusted to make a pass in the opposite direction but with the cutter bars inclined in reversed directions to slope the roof of the cut corresponding to the inclination of the first pass.

The details of the structure may be varied without departing from the spirit of the invention and the exclusive use of modifications within the scope of the claims is contemplated.

What is claimed is:

1. In a mining machine, ground-engaging traction means, a subframe carried thereon, a main frame having a gear case extending forwardly therefrom, said main frame mounted on said subframe, boring shafts journaled in the gear case and extending lengthwise of the subframe and spaced apart transversely of the subframe, radially adjustable cutter arms on the forward ends of said shafts, cutters on the outer ends of said arms upper and lower trimmer bars extending transversely of the machine behind said cutter arms, and individual manually operable devices mounted on the gear case and operatively connected to a respective trimmer bar to vary the elevation of either end of either bar relative to the subframe and independently of the other end of that bar.

2. Mining machine structure according to claim 1 which also includes additional manually operable means to tilt the main frame transversely of the subframe to increase the range between the maximum and minimum heights of the boring shafts and of the ends of the trimmer bars.

3. In a mining machine, ground-engaging traction means, a subframe carried thereon, a main frame having a gear case extending forwardly therefrom, said main frame supported on said subframe, boring shafts journaled on the gear case with their axes spaced apart transversely of the machine, radially adjustable cutter arms on said shafts, cutters on the outer ends of said arms, upper and lower trimmer bars extending transversely of the gear case behind said cutter arms, individually operable devices positioning each end of each bar vertically relative to the gear case and operable selectively to incline the corresponding associated bar vertically relative to the subframe and gear case.

4. Mining machine structure according to claim 3 in which main frame supporting devices are provided on the subframe at opposite sides of the machine, said devices being operative selectively to tilt the gear case with the relatively inclined trimmer bar transversely of the machine.

5. In a mining machine, a gear box having a pair of parallel boring shafts spaced transversely of the machine and provided with radial cutter arms, upper and lower cutter chain guides extending transversely of the machine rearwardly of said cutter arms, a cutter chain mounted on said guides, means for elevating and lowering said boring shafts relative to each other, sprockets mounted on the ends of the chain guides, and individual vertically disposed jacks supporting said guides on the gear box inwardly of said sprockets and operable independently of each other to vary the height of either end of each guide and the sprocket mounted thereon.

6. In a mining machine having a running gear, a subframe carried thereby, a main frame having a gear case extending forwardly therefrom, said main frame mounted on the subframe to tilt transversely of the length of the machine, guide elements slidable vertically on the gear case at opposite sides of the machine, a bottom trimmer bar extending from side to side of the machine and slidable horizontally on said guide elements, and support devices mounted on the gear case at opposite sides of the machine and connected to said cutter bar and operable selectively to raise and lower the corresponding ends of said trimmer bar independently of the inclination of the gear case.

7. In a mining machine having a running gear, a subframe carried thereby, a main frame having a gear case extending forwardly therefrom, said main frame mounted on the subframe to tilt transversely of the length of the machine and including a pair of depending jaws at each side of the machine and spaced apart transversely of the machine, individual guide elements slidable vertically in said jaws at opposite sides of the machine, a bottom trimmer bar extending from side to side of the machine and slidable horizontally on one of said elements and pivoted to swing vertically on the other of said elements, vertically disposed hydraulic cylinders and pistons mounted on the gear case at opposite sides of the machine and having supporting connections to the end portions of said trimmer bar, and operable selectively to raise and lower the corresponding ends of said trimmer bar independently of the inclination of the gear case.

8. In a mining machine, a running gear, a subframe carried thereby, a main frame having a gear case extending forwardly therefrom, said main frame mounted on the subframe to tilt thereon transversely of the length of the machine, a pair of upstanding hydraulic cylinders attached to the gear case and provided with independently operated pistons extending upwardly therefrom, an upper trimmer bar extending transversely of the machine and carried on said pistons, there being pin and slot connections between said trimmer bar and pistons accommodating movement of said trimmer bar transversely of the pistons, sprockets on the end portions of said trimmer bar, a cutter chain carried by said sprockets and trimmer bar and by other sprockets on the machine carrying and driving said chain, and yielding take-up sprockets maintaining the chain tension during adjustment of said trimmer bar relative to said gear case, and boring shafts journaled in said gear case below opposite ends of said trimmer bar and having radial arms with boring cutters at their outer ends, each arm being adjustable to move its cutters in arcs tangent to the cutter chain passing over said sprockets on the end portions of the trimmer bar.

9. In a mining machine having a subframe, a main frame having a gear case extending forwardly therefrom, said main frame mounted on the subframe, parallel boring shafts journaled on said gear case with extensible radial arms having cutters at the outer ends thereof, a trimmer bar mounted on said gear case behind said cutter arms and extending transversely of the length of the machine at the level of the bottom of the bore of said cutters, a horizontally elongated slide carried by said trimmer bar and extending transversely of the machine, a support member movable along said slide, a cutter chain sprocket carried by the outer end of said support member, means controllable by the operator of the machine for projecting and retracting said support member transversely of the machine parallel to the trimmer bar, and means individually adjusting the height of the ends of said trimmer bar vertically of the gear case irrespective of the lateral position of the sprockets on the trimmer bar.

10. Mining machine structure according to claim 9 in which opposite ends of the trimmer bar are individually adjustable vertically of the gear case, and opposite ends of the main frame are individually adjustable vertically of the subframe.

11. In a mining machine, ground engaging traction means, a subframe carried thereon, a main frame having a gear case extending forwardly therefrom, said main frame mounted on said subframe, boring shafts journaled on the gear case and extending lengthwise of the subframe and spaced apart transversely of the subframe, radially adjustable cutter arms on the forward ends of said shafts, upper and lower trimmer bars extending transversely of the machine behind said cutter arms, means on said gear case at opposite sides of the machine for supporting opposite ends of said trimmer bars and independently operable to adjust the height of either end of either trimmer bar relative to the gear case and subframe, a conveyor leading rearwardly and upwardly from the middle portion of the lower trimmer bar, and means on the middle of the lower trimmer bar pivotally supporting the conveyor for inclination relative to the trimmer bar.

12. In a mining machine, ground engaging traction means, a subframe carried thereon, a main frame having a gear case etxending forwardly therefrom, individual extensible and retractible supports at the sides of the subframe for adjustably supporting the sides of the main frame for tilting the gear case secured thereto transversely of the subframe, boring shafts journaled on the gear case and extending lengthwise of the subframe and provided with individually adjustable cutting arms, an endless cutter chain operable across the upper and lower portions of the gear case behind said cutter arms, upper and lower trimmer bars extending transversely of the gear case for guiding said cutter chain, and a conveyor extending rearwardly and upwardly from the lower trimmer bar and a support for the forward end of the conveyor comprising an element on the lower trimmer bar intermediate its ends and elongated transversely of the machine and upwardly convex lengthwise and providing for tilting of the conveyor relative to the cutter bar transversely of the machine.

References Cited by the Examiner

UNITED STATES PATENTS

| 2,715,527 | 8/1955 | Cartlidge et al. | 299—59 X |
| 2,801,836 | 8/1957 | Risse | 299—59 |
| 2,907,558 | 10/1959 | Hlinsky | 299—59 |
| 3,041,054 | 6/1962 | Ball | 299—59 X |

ERNEST R. PURSER, *Primary Examiner.*